US011075553B2

(12) United States Patent
Tong et al.

(10) Patent No.: US 11,075,553 B2
(45) Date of Patent: Jul. 27, 2021

(54) SYNCHRONOUS RELUCTANCE MOTOR ROTOR AND SYNCHRONOUS RELUCTANCE MOTOR

(71) Applicant: GREE GREEN REFRIGERATION TECHNOLOGY CENTER CO., LTD. OF ZHUHAI, Guangdong (CN)

(72) Inventors: Tong Tong, Guangdong (CN); Yusheng Hu, Guangdong (CN); Bin Chen, Guangdong (CN); Suhua Lu, Guangdong (CN)

(73) Assignee: GREE GREEN REFRIGERATION TECHNOLOGY CENTER CO., LTD. OF ZHUHAI, Guangdong (CN)

( * ) Notice: Subject to any disclaimer, the term of this patent is extended or adjusted under 35 U.S.C. 154(b) by 427 days.

(21) Appl. No.: 16/072,770

(22) PCT Filed: Jan. 23, 2017

(86) PCT No.: PCT/CN2017/072239
§ 371 (c)(1),
(2) Date: Jul. 25, 2018

(87) PCT Pub. No.: WO2017/129097
PCT Pub. Date: Aug. 3, 2017

(65) Prior Publication Data
US 2019/0036397 A1  Jan. 31, 2019

(30) Foreign Application Priority Data

Jan. 26, 2016 (CN) .......................... 201610052049.0

(51) Int. Cl.
*H02K 1/24* (2006.01)
*H02K 1/28* (2006.01)
*H02K 1/22* (2006.01)

(52) U.S. Cl.
CPC ............... *H02K 1/246* (2013.01); *H02K 1/22* (2013.01); *H02K 1/28* (2013.01); *H02K 2213/03* (2013.01)

(58) Field of Classification Search
CPC ........... H02K 1/246; H02K 1/22; H02K 1/28; H02K 2213/03
See application file for complete search history.

(56) References Cited

U.S. PATENT DOCUMENTS 6,259,181 B1 * 7/2001 Kawano ................. H02K 1/246
310/162
2004/0248022 A1  12/2004 Yoshida et al.
(Continued)

FOREIGN PATENT DOCUMENTS

| CN | 100335942 C | 9/2007 |
| CN | 101230856 A | 7/2008 |

(Continued)

OTHER PUBLICATIONS

International Search Report dated Apr. 24, 2017 in PCT/CN2017/072239, citing documents AO-AR therein, 2 pages.
(Continued)

*Primary Examiner* — Tulsidas C Patel
(74) *Attorney, Agent, or Firm* — Oblon, McClelland, Maier & Neustadt, L.L.P.

(57) ABSTRACT

A synchronous reluctance motor rotor, including: a rotor core, wherein the rotor core includes a plurality of magnetic-flux barrier groups, and each magnetic-flux barrier group includes at least two magnetic-flux barriers provided at an interval in a radial direction of the rotor core; the rotor core further includes magnetic bridges, the magnetic bridges are disposed within the magnetic-flux barriers and connect inner surfaces of the magnetic-flux barriers with outer surfaces of the magnetic-flux barriers, and a distance between the mag- (Continued)

netic bridges and an outer edge of the rotor core is no less than a predetermined distance.

14 Claims, 3 Drawing Sheets

(56) References Cited

U.S. PATENT DOCUMENTS

| | | | |
|---|---|---|---|
| 2012/0062053 A1 | 3/2012 | Moghaddam | |
| 2012/0074801 A1 | 3/2012 | Brown et al. | |
| 2012/0146448 A1* | 6/2012 | Moghaddam | H02K 1/246 |
| | | | 310/216.075 |
| 2013/0119819 A1 | 5/2013 | Lendenmann et al. | |
| 2015/0372577 A1 | 12/2015 | Haussmann et al. | |
| 2016/0329787 A1* | 11/2016 | Ito | H02K 1/246 |
| 2018/0226848 A1* | 8/2018 | Kolehmainen | H02K 19/14 |

FOREIGN PATENT DOCUMENTS

| | | |
|---|---|---|
| CN | 102349220 A | 2/2012 |
| CN | 102986123 A | 3/2013 |
| CN | 103095078 A | 5/2013 |
| CN | 204425064 U | 6/2015 |
| CN | 105122613 A | 12/2015 |
| CN | 105553139 A | 5/2016 |
| CN | 205544660 U | 8/2016 |
| JP | 3549329 B2 | 8/2004 |
| JP | 2013-502196 A | 1/2013 |
| KR | 10-2006-0105996 A | 10/2006 |
| KR | 10-0643902 B1 | 11/2006 |
| WO | WO 2008/123636 A1 | 10/2008 |

OTHER PUBLICATIONS

Extended European Search Report dated Aug. 12, 2019 in Patent Application No. 17743712.6, citing documents AA, AO and AP therein, 8 pages.

Chinese Office Action dated Jul. 14, 2017 in Patent Application No. 201610052049.0 (with English translation), citing documents AO and AP therein, 13 pages.

* cited by examiner

RELATED ART

SYNCHRONOUS RELUCTANCE MOTOR ROTOR AND SYNCHRONOUS RELUCTANCE MOTOR

The present application claims the priority of Chinese Patent Application No. 201610052049.0, filed in Chinese Patent Office on Jan. 26, 2016, and entitled "SYNCHRONOUS RELUCTANCE MOTOR ROTOR AND SYNCHRONOUS RELUCTANCE MOTOR", the entirety of which is incorporated herein by reference.

TECHNOLOGY FIELD

The present disclosure relates to the field of motors, and particularly relates to a synchronous reluctance motor rotor and a synchronous reluctance motor.

BACKGROUND

In the existing technical solution, a motor rotor structure was disclosed in publication No. CN101230856A. The structure is as shown in FIG. 1. The motor includes a stator and a rotor, both the stator sheets and rotor sheets adopt a laminated structure, wherein the rotor sheets include a plurality of magnetic-flux barriers 201 formed therein. For each magnetic-flux barrier 201, the distance from the outer circumferential surface of the rotor to the end of each magnetic-flux barrier 201 is substantially the same. For different magnetic-flux barriers 201, the distances between the ends of the magnetic-flux barriers 201 and the outer circumferential surface of the rotor are different. The rotor has an obvious feature that its outer surface is circumferential, and the bridges 203 for connecting the inner and outer surfaces of the magnetic-flux barriers directly face air gaps.

The presence of the bridges 203 is to ensure that the rotor can still be integrated on a machine after the respective magnetic-flux barriers 201 are formed inside the rotor, but the presence of the bridges 203 which directly face the air gaps causes magnetic-flux leakage. As shown by the magnetic force lines in FIG. 2, part of the magnetic-flux leakage is short-circuited directly through the bridges, and does not like the main magnetic circuit (effective magnetic force lines) shown by the dashed lines in FIG. 1 passing through magnetic conductive channels 202 of the rotor, resulting in a decrease in the salient pole difference of the motor and decline in performance.

SUMMARY

In view of this, the present disclosure provides a rotor for improving a phenomenon of magnetic-flux leakage.

According to one aspect of the present disclosure, there is provided a synchronous reluctance motor rotor, including a rotor core, wherein the rotor core comprises a plurality of magnetic-flux barrier groups, and each magnetic-flux barrier group comprises at least two magnetic-flux barriers provided at an interval in a radial direction of the rotor core; the rotor core further comprises magnetic bridges, the magnetic bridges are disposed within the magnetic-flux barriers and connect inner surfaces of the magnetic-flux barriers with outer surfaces of the magnetic-flux barriers, and a distance between the magnetic bridges and an outer edge of the rotor core is no less than a predetermined distance.

In some embodiments, each of the magnetic-flux barriers comprises arm slots and a beam slot, the arm slots extend in a direction parallel to a D-axis, the beam slot extends in a direction perpendicular to a Q-axis, and the arm slots communicate with the beam slot at two ends of the beam slot and are located on a radial outer side of the beam slot.

In some embodiments, an arc transition is formed between the arm slots and the beam slot.

In some embodiments, each of the magnetic-flux barriers comprises arm slots disposed on two sides, the arm slots extend in a direction parallel to a D-axis, and the arm slots are connected through an arc slot.

In some embodiments, each magnetic bridge of the magnetic bridges is arranged in the slot arm, and a distance H between the magnetic bridge and the outer edge of the rotor core satisfies: $0.4L \geq H \geq 0.2L$, wherein L is a length of the slot arm where the magnetic bridge is located.

In some embodiments, in each magnetic-flux barrier group, the distances H between the magnetic bridges of magnetic-flux barriers and the outer edge of the rotor core gradually decrease in a direction from the D-axis to the Q-axis.

In some embodiments, in a rotating direction of the motor, each of the magnetic-flux barriers comprises a front magnetic bridge and a rear magnetic bridge, the rear magnetic bridge located downstream of the front magnetic bridge along the rotating direction, and a width W1 of the front magnetic bridge is smaller than a width W2 of the rear magnetic bridge.

In some embodiments, both the width W1 of the front magnetic bridge and the width W2 of the rear magnetic bridge are 0.8-1.2 mm.

In some embodiments, an angle θ between the Q-axis of the magnetic-flux barrier group and each magnetic bridge of the magnetic bridges thereof is: $(180-90/p) \leq \theta \leq (180-90/p+\delta)$, in degrees; wherein p represents the number of pole pairs of the motor, and δ is 20°.

In some embodiments, the rotor core includes a plurality of rotor plates made of a magnetic conductive material.

In some embodiments, the plurality of rotor plates are connected by rivets.

In some embodiments, the magnetic-flux barriers extend to the outer edge of the rotor core and form openings at the outer edge of the rotor core.

According to another aspect of the present disclosure, there is provided a synchronous reluctance motor, including the aforementioned synchronous reluctance motor rotor.

According to the embodiments of the present disclosure, the magnetic bridges are disposed within the magnetic-flux barriers and have a certain distance from the outer edge of the rotor core, which can effectively improve the phenomenon of magnetic-flux leakage and increase the output of the motor under the same input to achieve the purpose of improving the performance of the motor. In some embodiments, the rear magnetic bridge is wider than the front magnetic bridge on the same pole in the rotor core, so compared with a structure which rear magnetic bridge and front magnetic bridge have the same width and have the same magnetic-flux leakage, the strength of the motor rotor can be improved. In some further embodiments, since the magnetic bridge is disposed within the magnetic-flux barrier, rather than at the outer edge of the rotor core, the angle between the centerline of the magnetic bridge and the Q-axis is not limited by the outer contour of the rotor, and the angle can be designed according to the actual force condition of the rotor to improve the strength of the rotor.

BRIEF DESCRIPTION OF THE DRAWINGS

The above and other objectives, features and advantages of the present disclosure will be clearer through the following description of the embodiments of the present disclosure with reference to the accompanying drawings, in which.

DETAILED DESCRIPTION OF THE EMBODIMENTS

Figure 1:
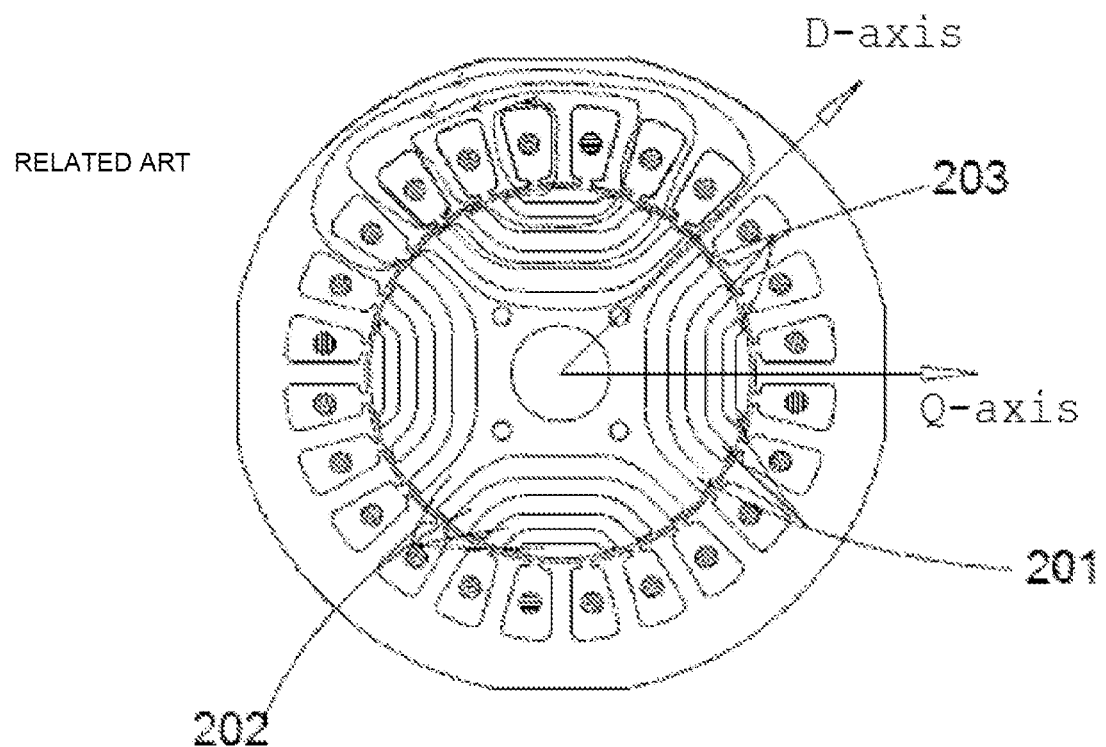
FIG. 1 is a structural schematic diagram indicating that a rotor and a stator of a synchronous reluctance motor in the prior art cooperate with each other.
Figure 2:
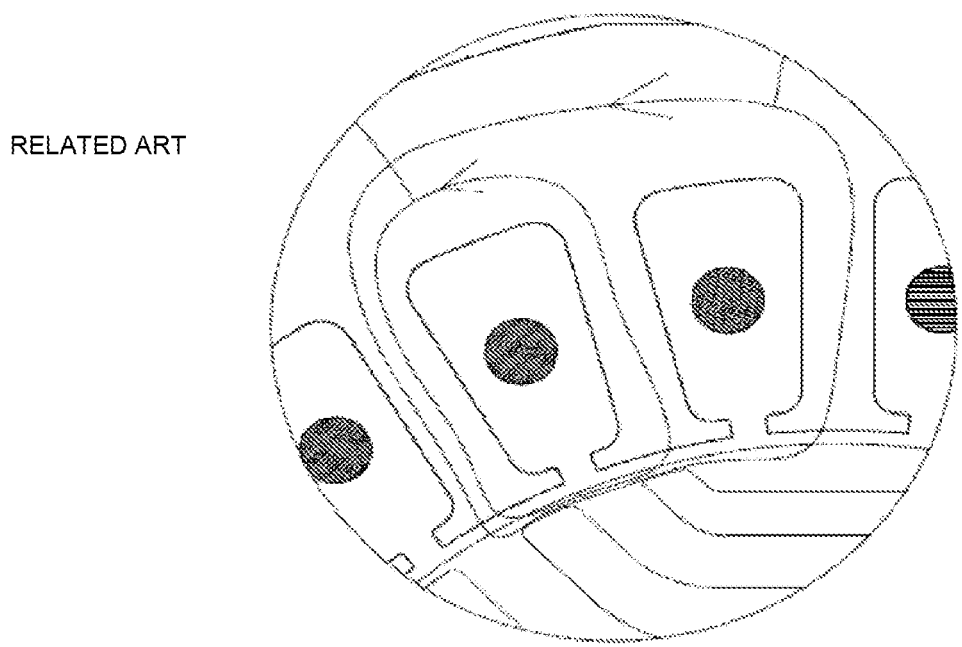
FIG. 2 is a schematic diagram of magnetic force lines of leakage magnetic fields of the synchronous reluctance motor rotor in the prior art.

The present disclosure will be described below based on embodiments, but the present disclosure is not only limited to these embodiments. In the following detailed description of the present disclosure, some specific details are well described. The present disclosure can also be fully understood by those skilled in the art without the description of these details. In order to avoid confusing the essence of the present disclosure, well-known methods, processes, flows and components will not be described in detail.

The structure of a synchronous reluctance motor rotor according to some embodiments of the present disclosure will be described in detail with reference to FIGS. 3-6. As shown in FIG. 5, the rotor includes a rotor core 1, and the rotor core 1 includes a plurality of magnetic-flux barrier groups 11. Each magnetic-flux barrier group 11 includes at least two magnetic-flux barriers provided at an interval in a radial direction of the rotor core 1. A magnetic conductive channel is provided between the adjacent magnetic-flux barriers. The magnetic-flux barriers extend to the outer edge of the rotor core 1 and form an opening at the outer edge of the rotor core 1. The rotor core 1 further includes magnetic bridges 13, the magnetic bridges 13 are disposed within the magnetic-flux barriers and connect the inner of the magnetic-flux barriers with outer surfaces of the magnetic-flux barriers, and a distance between the magnetic bridges 13 and the outer edge of the rotor core is no less than a predetermined distance. The outer edge of the rotor core refers to the outer circumference where the outer edge of the rotor core is located.

The synchronous reluctance motor rotor in the present disclosure will be described below in detail, taking FIG. 4 as an example. The synchronous reluctance motor rotor in the present embodiments includes four magnetic-flux barrier groups 11, that is to say, the synchronous reluctance motor rotor has four poles. The four magnetic-flux barrier groups are uniformly distributed in a circumferential direction with the center of the rotor as a center, and each magnetic-flux barrier group 11 includes three layers of magnetic-flux barriers arranged in order from the inside to the outside in the radial direction, which are respectively a first magnetic-flux barrier 11a on the inner side, a second magnetic-flux barrier 11b in the middle and a third magnetic-flux barrier 11c on the outer side. Each magnetic-flux barrier is an arc curved away from the center of the rotor, and each magnetic-flux barrier includes arm slots 112 and a beam slot 111, wherein the arm slots 112 extend in a direction parallel to the D-axis, the beam slot 111 extends in a direction perpendicular to the Q-axis, and the arm slots 112 communicate with the beam slot 111 at two ends of the beam slot 111 and are located on the radial outer side of the beam slot 111. The Q-axis refers to the centerline of the magnetic-flux barrier group itself, and the D-axis refers to the centerline of the adjacent magnetic-flux barrier groups. The number of layers of the magnetic-flux barriers of the rotor core 1 can be selected according to needs, and the number of magnetic pole structures on the rotor core 1 can also be selected according to needs.

Figure 3:
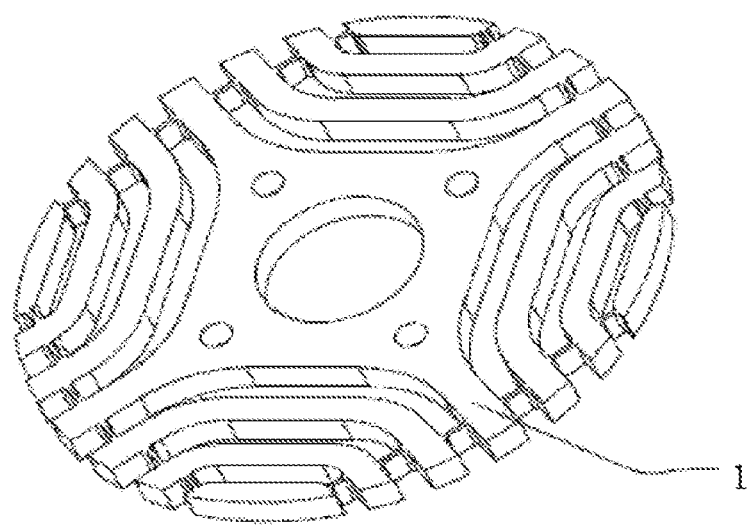
FIG. 3 is a three-dimensional structural schematic diagram of a synchronous reluctance motor rotor according to the present disclosure.
Figure 4:
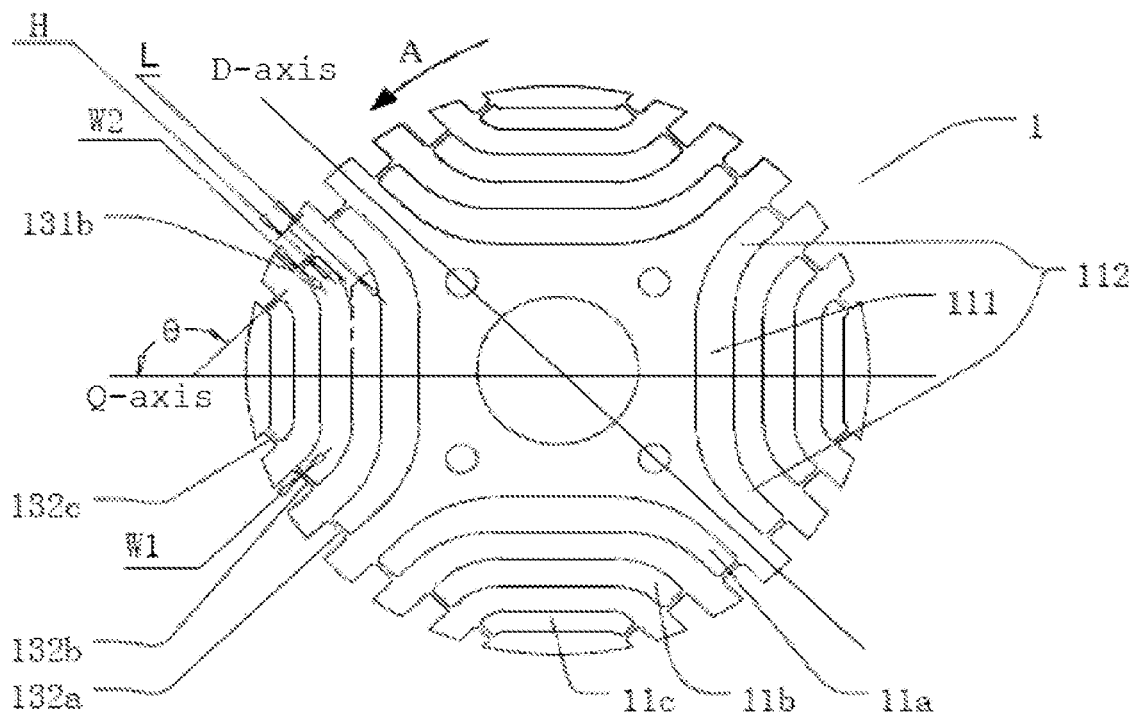
FIG. 4 is a two-dimensional structural schematic diagram of the synchronous reluctance motor rotor according to the present disclosure.
Figure 5:
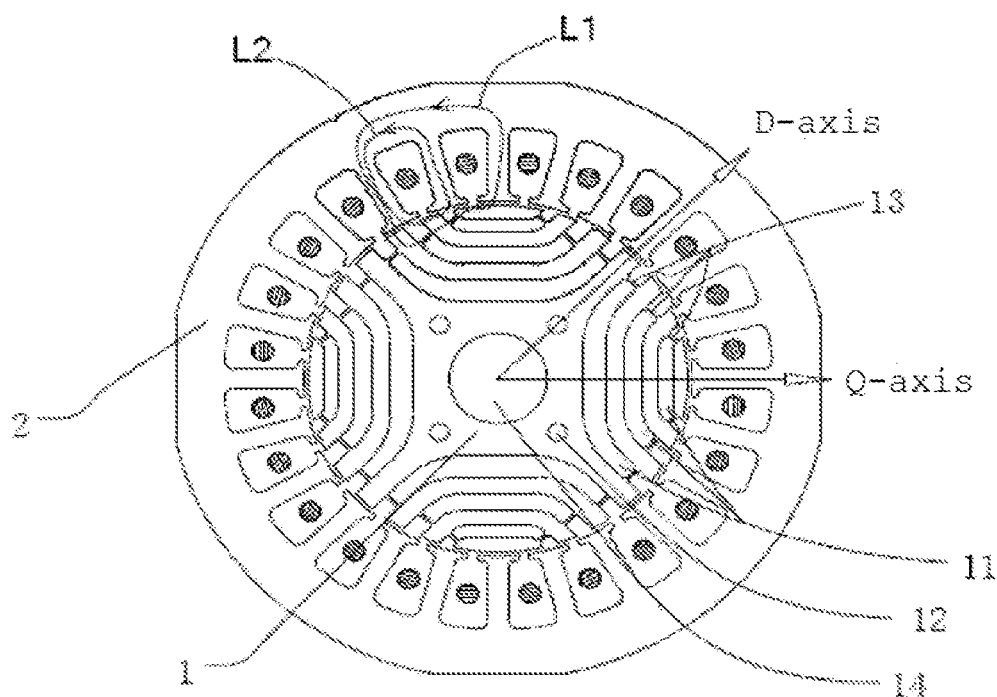
FIG. 5 is a structural schematic diagram indicating that a rotor and a stator of a synchronous reluctance motor according to the present disclosure cooperate with each other.
Figure 6:
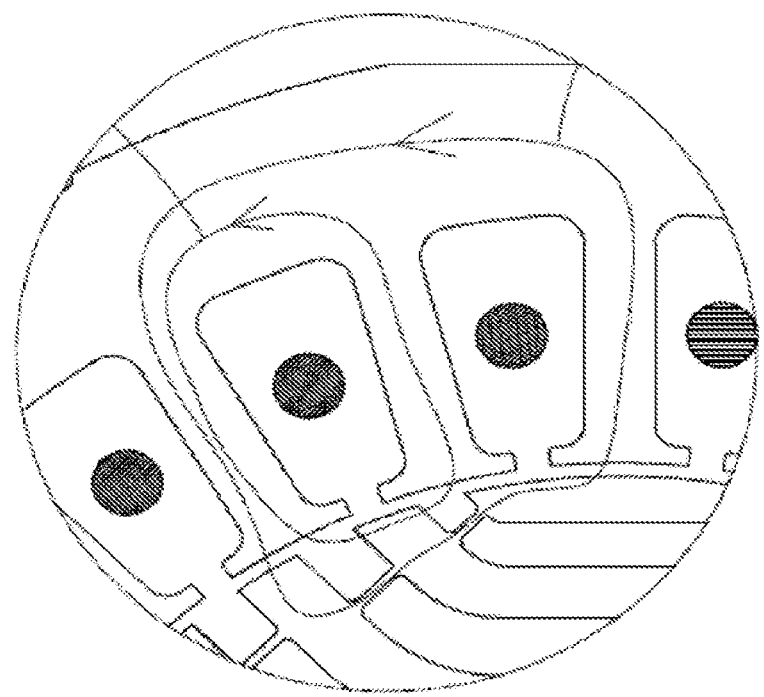
FIG. 6 is a schematic diagram of magnetic force lines of leakage magnetic fields of the synchronous reluctance motor rotor according to the present disclosure.

The first magnetic-flux barrier 11a, the second magnetic-flux barrier 11b in the middle and the third magnetic-flux barrier 11c on the outer side extend to the outer edge of the rotor core 1 and form an opening at the outer edge of the rotor core, as shown in FIG. 4. A first magnetic bridge 132a is provided in the arm slots on two sides of the first magnetic-flux barrier 11a, a second magnetic bridge 132b is provided in the arm slots on two sides of the second magnetic-flux barrier 11b in the middle and a third magnetic bridge 132c is provided in the arm slots on two sides of the third magnetic-flux barrier 11c on the outer side. The magnetic bridges 13 are provided within the arm slots, the distances between the magnetic bridge and the outer edge of the rotor core 1 are no less than a predetermined distance, and the arm slots form openings at the outer edge of the rotor core 1. Thus, the outer circumference of the rotor core 1 is not a continuous circle, but a discontinuous circle with a plurality of openings, as shown in FIG. 3. By adopting the above structure, magnetic force lines are as shown in FIG. 6. The magnetic force lines are introduced into the magnetic conductive channels and then pass through the magnetic bridges 13. The magnetic force lines on the outer ring always pass through the magnetic bridges 13, which can be improved by means of reluctance generated by the magnetic pressure drop on the magnetic conductive channels. The passing air length of the magnetic force lines on the inner ring is significantly increased, so the reluctance is increased, and the magnetic-flux leakage of this part is reduced significantly. In addition, since the magnetic bridges 13 are not provided on the outer circumference of the rotor core, the angles between the Q axes and the magnetic bridges and the positions and widths of the magnetic bridges in the magnetic-flux barriers are not restricted from conforming to the shape of the outer circumference of the rotor core, and parameters of the magnetic-flux barriers can be adjusted and optimized at any time according to the force condition of the motor.

As a optional solution, an arc transition is formed between the arm slots and the beam slot of each magnetic-flux barrier. When the radius of the arc transition is large, the beam slot may not be provided, and the arm slots on the two sides are connected directly through an arc slot, and the length L of the slot wall is the distance from the intersection of tangent extension lines at the two ends of the arc slot to the outer edge of the rotor core.

In some embodiments, as shown in FIG. 4, the distance H between the outer edge of the magnetic bridge and the outer edge of the rotor core satisfies the following condition: $0.4L \geq H \geq 0.2L$, wherein L is the length of the slot arm where the magnetic bridge is located, and is specifically the distance from the intersection of the extension line of the inner edge of the slot arm and the extension line of the beam slot to the outer edge of the rotor core.

In some embodiments, in each magnetic-flux barrier group, the distances H between the magnetic bridges of different magnetic-flux barriers and the outer edge of the rotor core gradually decrease in the direction from the D-axis to the Q-axis, taking FIG. 4 as an example, the distances from the first magnetic bridge 132a, the second magnetic bridge 132b and the third magnetic bridge 132c to the outer edge of the rotor core are respectively Ha, Hb and He (not shown in the figure), and Ha, Hb and He satisfy the following relation: Ha>Hb>Hc. In this way, the centerlines of the magnetic bridges 13 on all layers may not be on the same straight line, but are misaligned to a certain extent, so that after the motor stator is powered on, the magnetic-flux barriers can be increased between the layers when the magnetic force lines pass through the motor rotor from the N pole to the S pole.

In some embodiments, the two magnetic bridges located on two sides of each magnetic-flux barrier respectively are divided into a front magnetic bridge disposed at the front end of the rotating direction and a rear magnetic bridge disposed at the rear end of the rotating direction in the rotating direction of the motor (that is, the rear magnetic bridge locates downstream of the front magnetic bridge along the rotating direction), and the width of the front magnetic bridge is smaller than the width of the rear magnetic bridge. For a one-way rotating motor, the force applied to the rear magnetic bridge is greater than that applied to the front magnetic bridge, and such design can improve the strength of the rotor. Specifically, as shown in FIG. 4, taking the second magnetic-flux barrier 11b as an example, the direction of arrow A in FIG. 4 is the rotating direction of the motor, the second magnetic bridge 132b is the front magnetic bridge and the width thereof is W2, the fourth magnetic bridge 131b is a rear magnetic bridge and the width thereof is W1, and W2>W1. The width of the magnetic bridge 13 should meet a certain range. If the magnetic bridge 13 is too wide, the magnetic isolation effect will be affected; if the magnetic bridge 13 is too narrow, the mechanical strength of the entire rotor will be affected; and the width of the magnetic bridge 13 is set at a range of 0.8 to 1.2 mm, so that the optimal magnetic isolation effect can be achieved on the premise that the mechanical strength of the rotor is ensured.

In some embodiments, the angle θ between the Q-axis of the magnetic-flux barrier group and the magnetic bridge 13 of the magnetic bridges thereof is: $(180-90/p) \leq \theta \leq (180-90/p+\delta)$, in degrees; wherein p represents the number of poles of the motor, δ is 20°, and the number of poles is 4 in this embodiment.

In some embodiments, the rotor core 13 is formed by superimposing a plurality of rotor plates, the rotor plates are optionally made of a magnetic conductive material such as silicon steel plates and are relatively thinner. Each rotor plate is provided with a shaft hole 14, rivet holes 12 are provided on the periphery of the shaft hole 14, as shown in FIG. 5, and the plurality of rotor plates are connected by rivets through the rivet holes 12, so that the assembly structure is simple, and axial lamination and other complicated processes are not required.

The present disclosure also provides a synchronous reluctance motor, including the aforementioned synchronous reluctance motor rotor.

According to the synchronous reluctance motor of the present disclosure, the magnetic bridges are disposed within the magnetic-flux barriers and leave a predetermined distance from the outer edge of the rotor core, thereby effectively reducing magnetic-flux leakage and improving the performance of the motor.

It can be seen from the above description, the above embodiments of the present disclosure achieve the following technical effects:

According to the synchronous reluctance motor rotor and the synchronous reluctance motor of the present disclosure, the magnetic bridges are disposed within the magnetic-flux barriers and leave a predetermined distance from the outer edge of the rotor core, thereby effectively reducing magnetic-flux leakage; at the same time, since the magnetic bridges do not need to conform to the shape of the outer edge of the rotor, the angles between the magnetic bridges and the Q axes and the positions and widths of the magnetic bridges within the magnetic-flux barriers can be adjusted and optimized according to needs, and a more optimal design can be realized according to the force condition of the motor.

Moreover, those of ordinary skill in the art should understand that the drawings provided herein are for the purpose of illustration only, and the drawings are not necessarily drawn to scale.

Meanwhile, it should be understood that the exemplary embodiments are provided so that the present disclosure is comprehensive and its scope is fully conveyed to those skilled in the art.

Many specific details (e.g., examples of specific components, devices and methods) are set forth to provide a comprehensive understanding of the present disclosure. It would be understood by those skilled in the art that the exemplary embodiments may be implemented in many different forms without adopting specific details, and the exemplary embodiments should not be understood as limiting the scope of the present disclosure. In some exemplary embodiments, well-known device structures and well-known technologies are not described in detail. In the present disclosure, "a plurality of" means two or more.

The invention claimed is:

1. A synchronous reluctance motor rotor, comprising a rotor core, wherein the rotor core comprises a plurality of magnetic-flux barrier groups, and each magnetic-flux barrier group comprises at least two magnetic-flux barriers provided at an interval in a radial direction of the rotor core; the rotor core further comprises magnetic bridges, the magnetic bridges are disposed within the magnetic-flux barriers and connect inner surfaces of the magnetic-flux barriers with outer surfaces of the magnetic-flux barriers, and a distance between the magnetic bridges and an outer edge of the rotor core is no less than a predetermined distance, wherein an angle θ between a Q-axis of the magnetic-flux barrier group and each magnetic bridge of the magnetic bridges thereof is: $(180-90/p) \leq \theta \leq (180-90/p+\delta)$, in degrees, wherein p represents a number of pole pairs of the motor, and δ is 20°.

2. The synchronous reluctance motor rotor according to claim 1, wherein each of the magnetic-flux barriers comprises arm slots and a beam slot, the arm slots extend in a direction parallel to a D-axis, the beam slot extends in a direction perpendicular to a Q-axis, and the arm slots communicate with the beam slot at two ends of the beam slot and are located on a radial outer side of the beam slot.

3. The synchronous reluctance motor rotor according to claim 2, wherein an arc transition is formed between the arm slots and the beam slot.

4. The synchronous reluctance motor rotor according to claim 1, wherein each of the magnetic-flux barriers comprises arm slots disposed on two sides, the arm slots extend in a direction parallel to a D-axis, and the arm slots are connected through an arc slot.

5. The synchronous reluctance motor rotor according to claim 2, wherein each magnetic bridge of the magnetic bridges is arranged in the arm slot, and a distance H between the magnetic bridge and the outer edge of the rotor core satisfies: $0.4L \geq H \geq 0.2L$, wherein L is a length of the arm slot where the magnetic bridge is located.

6. The synchronous reluctance motor rotor according to claim 5, wherein in each magnetic-flux barrier group, the distances H between the magnetic bridges of magnetic-flux barriers and the outer edge of the rotor core gradually decrease in a direction from the D-axis to the Q-axis.

7. The synchronous reluctance motor rotor according to claim 1, wherein in a rotating direction of the motor, each of the magnetic-flux barriers comprises a front magnetic bridge and a rear magnetic bridge, the rear magnetic bridge located downstream of the front magnetic bridge along the rotating direction, and a width W1 of the front magnetic bridge is smaller than a width W2 of the rear magnetic bridge.

8. The synchronous reluctance motor rotor according to claim 1, wherein in a rotating direction of the motor, each of the magnetic-flux barriers comprises a front magnetic bridge and a rear magnetic bridge, the rear magnetic bridge located downstream of the front magnetic bridge along the rotating direction, and both a width W1 of the front magnetic bridge and a width W2 of the rear magnetic bridge are 0.8-1.2 mm.

9. The synchronous reluctance motor rotor according to claim 1, wherein the rotor core comprises a plurality of rotor plates made of a magnetic conductive material.

10. The synchronous reluctance motor rotor according to claim 9, wherein the plurality of rotor plates are connected by rivets.

11. The synchronous reluctance motor rotor according to claim 1, wherein the magnetic-flux barriers extend to the outer edge of the rotor core and form openings at the outer edge of the rotor core.

12. A synchronous reluctance motor, comprising the synchronous reluctance motor rotor according to claim 1.

13. The synchronous reluctance motor rotor according to claim 4, wherein each magnetic bridge of the magnetic bridges is arranged in the arm slot, and a distance H between the magnetic bridge and the outer edge of the rotor core satisfies: $0.4L \geq H \geq 0.2L$, wherein L is a length of the arm slot where the magnetic bridge is located.

14. The synchronous reluctance motor rotor according to claim 13, wherein in each magnetic-flux barrier group, the distances H between the magnetic bridges of magnetic-flux barriers and the outer edge of the rotor core gradually decrease in a direction from the D-axis to the Q-axis.

* * * * *